(12) United States Patent
Ko et al.

(10) Patent No.: US 11,453,456 B2
(45) Date of Patent: Sep. 27, 2022

(54) PERSONAL MOBILITY APPARATUS

(71) Applicants: HYUNDAI MOTOR COMPANY, Seoul (KR); KIA MOTORS CORPORATION, Seoul (KR)

(72) Inventors: Hun Keon Ko, Anyang-si (KR); Dong Han Koo, Seoul (KR); Jun Hwan Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 373 days.

(21) Appl. No.: 16/677,021

(22) Filed: Nov. 7, 2019

(65) Prior Publication Data

US 2020/0189682 A1 Jun. 18, 2020

(30) Foreign Application Priority Data

Dec. 13, 2018 (KR) .......................... 10-2018-0160989

(51) Int. Cl.
| | |
|---|---|
| *B62K 5/05* | (2013.01) |
| *B62K 13/00* | (2006.01) |
| *B62K 15/00* | (2006.01) |
| *B62J 99/00* | (2020.01) |
| *B62K 5/08* | (2006.01) |
| *B62J 50/21* | (2020.01) |

(52) U.S. Cl.
CPC .............. *B62K 5/05* (2013.01); *B62J 99/00* (2013.01); *B62K 5/08* (2013.01); *B62K 13/00* (2013.01); *B62K 15/00* (2013.01); *B62J 50/225* (2020.02); *B62K 2015/005* (2013.01)

(58) Field of Classification Search
CPC . B62K 5/05; B62K 5/08; B62K 13/00; B62K 15/00; B62K 2015/005; B62K 13/04
USPC .............................. 180/65.1, 208, 209, 211
See application file for complete search history.

(56) References Cited

U.S. PATENT DOCUMENTS

| | | | |
|---|---|---|---|
| 3,618,970 A | 11/1971 | Frigaard | |
| 5,248,011 A | 9/1993 | Richards | |
| 6,460,866 B1 * | 10/2002 | Altschul | ................... A45F 4/02 |
| | | | 280/304.5 |

(Continued)

FOREIGN PATENT DOCUMENTS

| | | | |
|---|---|---|---|
| EP | 2514661 A1 * | 10/2012 | ........... B62K 15/006 |
| WO | 2011031992 A2 | 3/2011 | |

(Continued)

OTHER PUBLICATIONS

Office Action cited in U.S. Appl. No. 16/922,480; dated Jun. 13, 2022; 10 pages.

*Primary Examiner* — Paul N Dickson
*Assistant Examiner* — Caitlin Anne Miller
(74) *Attorney, Agent, or Firm* — Lempia Summerfield Katz LLC

(57) ABSTRACT

A personal mobility apparatus includes: a support platform having a pair of footplates and a cavity; two drive wheels disposed on both sides of the support platform, respectively; and a steering wheel connected to the support platform to be received in the cavity. The steering wheel is connected through a telescopic tube to be received in the cavity of the support platform and the telescopic tube includes a first tube and a second tube moving telescopically with respect to the first tube.

10 Claims, 7 Drawing Sheets

(56) References Cited

U.S. PATENT DOCUMENTS

| | | |
|---|---|---|
| 6,561,294 B1 | 5/2003 | Kamen |
| 7,159,681 B1 * | 1/2007 | Sauve .................... B60N 2/305 |
| | | 180/208 |
| 8,469,374 B2 | 6/2013 | Graf |
| 9,272,739 B2 * | 3/2016 | Zaid ....................... B62K 21/12 |
| 9,339,431 B2 | 5/2016 | Menard et al. |
| 9,688,340 B1 | 6/2017 | Kroymann |
| 10,421,515 B2 * | 9/2019 | Koo ........................ B62M 7/12 |
| 10,926,825 B2 | 2/2021 | Neugebauer et al. |
| 2004/0100083 A1 | 5/2004 | Brackett et al. |
| 2004/0113395 A1 * | 6/2004 | Nimis .................... B62K 3/002 |
| | | 280/651 |
| 2006/0108165 A1 | 5/2006 | Kamen et al. |
| 2009/0255747 A1 | 10/2009 | Kasaba |
| 2017/0190377 A1 | 7/2017 | Ku |
| 2018/0015978 A1 | 1/2018 | Delgatty et al. |
| 2018/0022411 A1 | 1/2018 | Kistemaker et al. |
| 2018/0056152 A1 * | 3/2018 | Reimers ................. B62B 3/106 |
| 2019/0111989 A1 | 4/2019 | Neugebauer et al. |
| 2020/0008990 A1 * | 1/2020 | Harrison ................ B62K 5/025 |
| 2020/0189682 A1 | 6/2020 | Ko et al. |

FOREIGN PATENT DOCUMENTS

| | | |
|---|---|---|
| WO | 2011132185 A1 | 10/2011 |
| WO | 2015143523 A1 | 10/2015 |
| WO | 2016170364 A1 | 10/2016 |
| WO | 2017164928 A1 | 9/2017 |
| WO | 2020178842 A1 | 9/2020 |

* cited by examiner

PERSONAL MOBILITY APPARATUS

CROSS-REFERENCE TO RELATED APPLICATION

This application is based on and claims the benefit of priority to Korean Patent Application No. 10-2018-0160989, filed on Dec. 13, 2018, in the Korean Intellectual Property Office, the disclosure of which is incorporated herein in its entirety by reference.

TECHNICAL FIELD

The present disclosure relates to personal mobility, and more particularly, to a personal mobility apparatus capable of selectively switching between a two-wheel mode and a three-wheel mode by varying the number of wheels according to operating condition, surrounding environment, and the like.

BACKGROUND

Recently, the personal mobility market is growing rapidly. Users move around easily using their own personal mobility apparatuses or devices for relatively short travel distances.

A personal mobility apparatus or device (hereinafter "personal mobility apparatus"), which is a means of transport for individuals that mainly runs on electricity, may include an electric wheel, an electric kickboard, an electric skateboard, an electric bicycle, or the like. The personal mobility apparatus may be used as a means of transport and leisure because it is small in size and does not generate harmful emissions.

The personal mobility apparatuses may be classified into one-wheel type, two-wheel type, three-wheel type, and the like. Conventional personal mobility has failed to vary the number of wheels according to operating conditions, surrounding environments, and the like, resulting in reduced mobility efficiency.

The above information described in this background section is provided to assist in understanding the background of the inventive concept, and may include any technical concept, which is not considered as the prior art that is already known to those having ordinary skill in the art.

SUMMARY

The present disclosure is made to solve the above-mentioned problems occurring in the prior art while advantages achieved by the prior art are maintained intact.

An aspect of the present disclosure provides a personal mobility apparatus capable of selectively switching between a two-wheel mode and a three-wheel mode by varying the number of wheels according to operating condition, surrounding environment, and the like.

According to an aspect of the present disclosure, a personal mobility apparatus may include: a support platform having a pair of footplates and a cavity; two drive wheels disposed on both sides of the support platform; and a steering wheel connected to the support platform to be received in the cavity.

The steering wheel may be connected to be received in the cavity of the support platform through a telescopic tube.

The telescopic tube may include a first tube and a second tube moving telescopically with respect to the first tube.

The steering wheel may be connected to a wheel fork. The wheel fork may have a steering shaft. The steering shaft of the wheel fork may be mounted rotatably with respect to a steering block. The steering block may be pivotally connected to the second tube of the telescopic tube.

The steering wheel may be received in the cavity or may be drawn out from the cavity as the second tube moves telescopically with respect to the first tube and the first tube moves to the inside or outside of the cavity.

The personal mobility apparatus may further include a main post connected to the support platform through a base member. The base member may be rotatably mounted on the support platform through a shaft.

The main post may include a first post pivotally connected to the base member and a second post pivotally connected to the first post.

A pair of handles may be mounted on a top end of the second post and a display may be disposed between the pair of handles.

The personal mobility apparatus may further include a seat mounted on the second post to be folded or unfolded.

The personal mobility apparatus may further include a return mechanism returning the base member to a center position.

The return mechanism may include a housing located below the base member, a spring connected to the base member, a roller connected to the spring, and a pair of inclined surfaces symmetrically disposed on both left and right inner sides of the housing. The roller may contact any one of the pair of inclined surfaces as the base member rotates.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
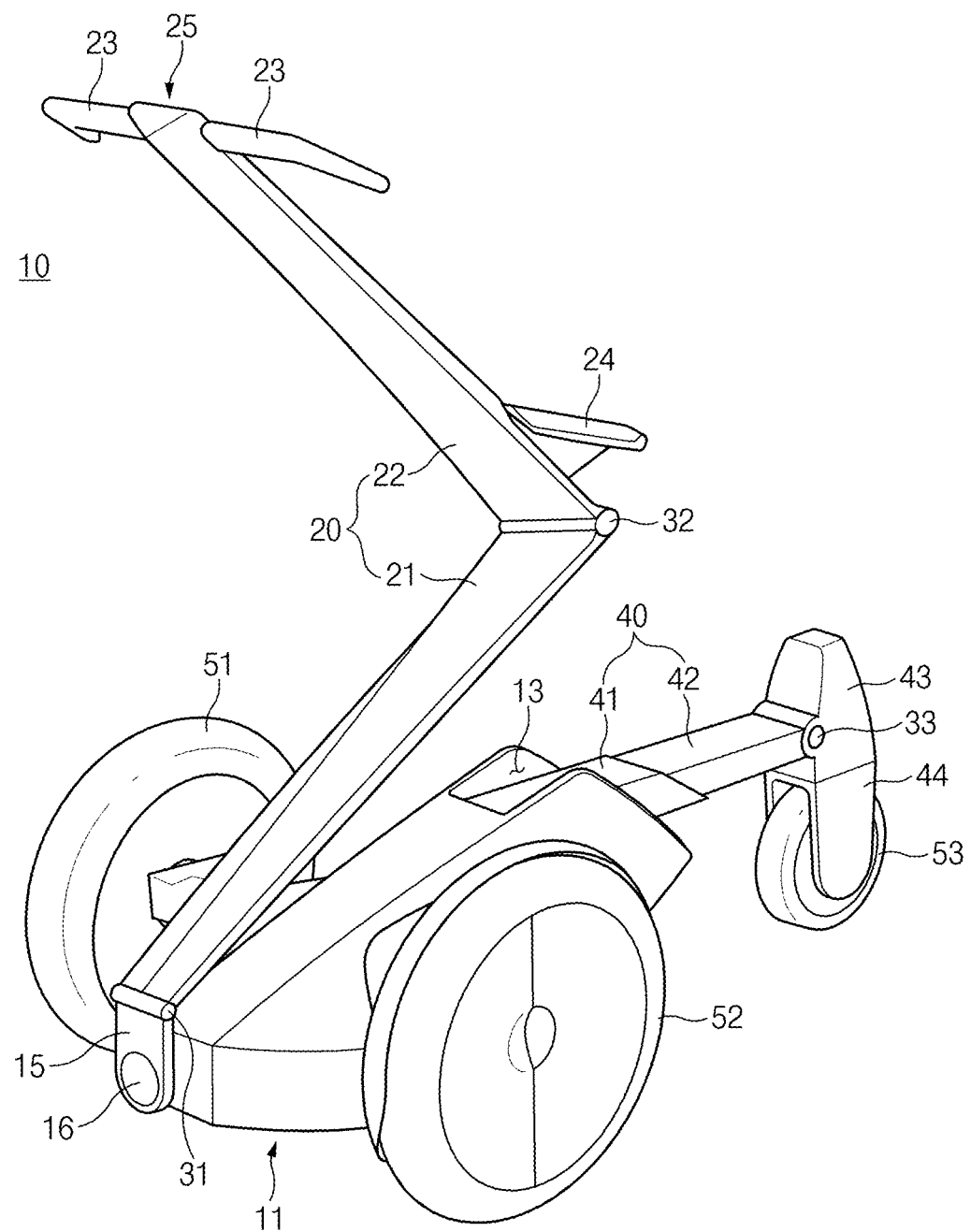
FIG. 1 illustrates a perspective view of a personal mobility apparatus according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been excluded in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Referring to FIGS. 1-4, a personal mobility apparatus 10 according to an embodiment of the present disclosure may include a support platform 11 having a pair of footplates 12. The personal mobility apparatus 10 may also include two drive wheels 51 and 52 disposed on both sides of the support platform 11.

A controller, electronic components, a charger or battery, and the like may be built in the support platform 11.

A base member 15 may be rotatably mounted on a front end of the support platform 11 through a shaft 16. The base member 15 may rotate around the shaft 16.

A main post 20 may be connected to the front end of the support platform 11 through the base member 15.

A bottom end of the main post 20 may be pivotally connected to the base member 15 through a first hinge 31. The first hinge 31 may be a self-locking hinge configured to hold or lock the main post 20 in a predetermined or desired position.

The main post 20 may include a first post 21 and a second post 22 pivotally connected to the first post 21 through a second hinge 32.

The first post 21 may be pivotally connected to the base member 15 through the first hinge 31. A seat 24 may be mounted on the second post 22 to be unfolded or folded. For example, when the seat 24 is unfolded horizontally with respect to the second post 22 as indicated by the seat 24 position in FIG. 2, a user may sit on the horizontally unfolded seat 24.

The second hinge 32 may be a self-locking hinge configured to hold or lock the second post 22 in a predetermined or desired position.

Figure 2:
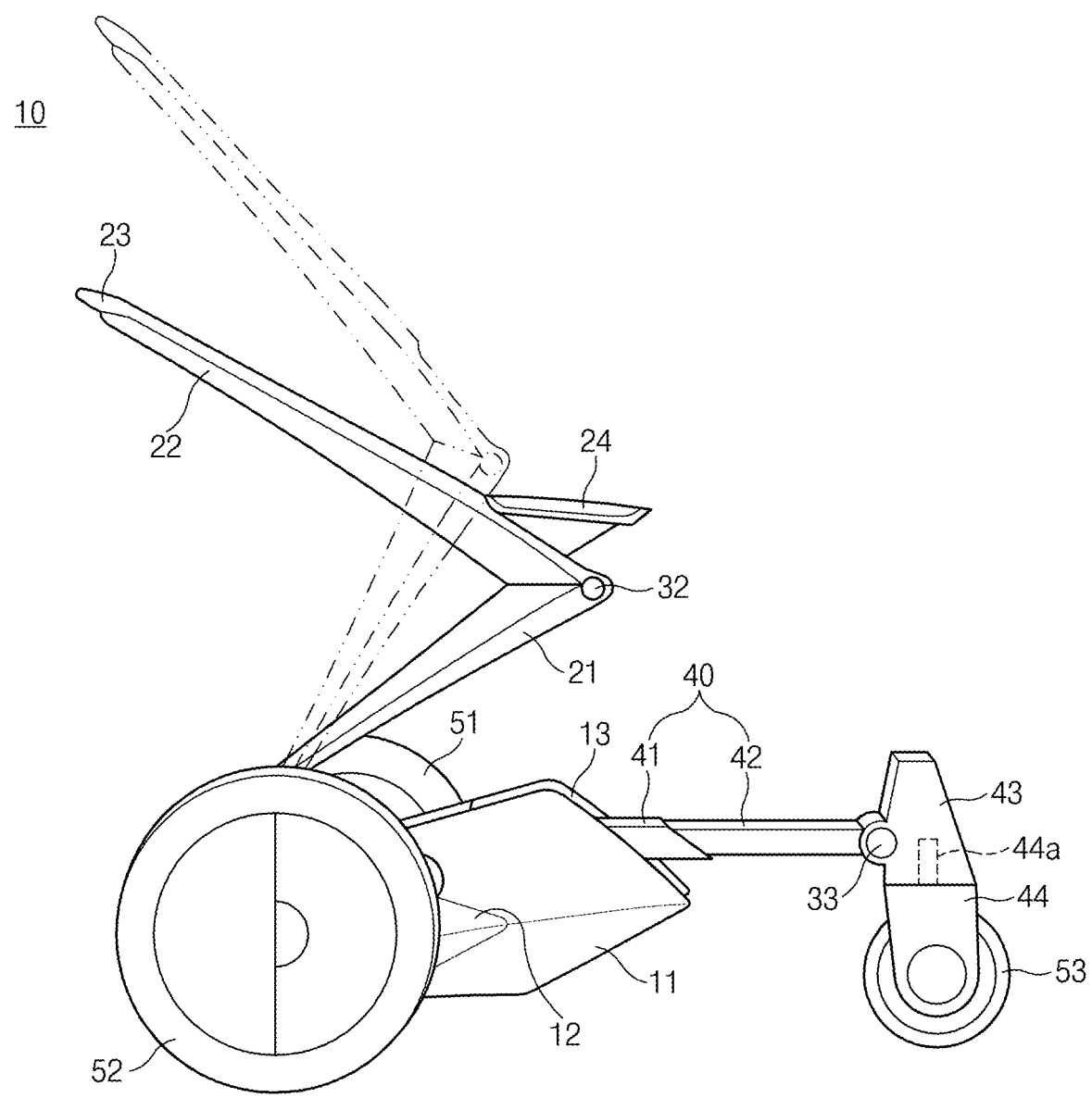
FIG. 2 illustrates a side view of a personal mobility apparatus according to an embodiment of the present disclosure.

The main post 20 may have a structure in which the first post 21 and the second post 22 are connected at a joint, such as the second hinge 32, so that a height of the main post 20 may be appropriately adjusted in accordance with the body shape or posture of the user as illustrated in FIG. 2.

According to an embodiment, the user may fold the first post 21 and the second post 22 at an appropriate angle to reduce the height of the main post 20. The user may unfold the seat 24 horizontally with respect to the second post 22 (see FIG. 2), so that the user may be able to drive the personal mobility apparatus 10 in a seating mode while sitting on the seat 24.

According to another embodiment, the user may unfold the first post 21 and the second post 22 to increase the height of the main post 20. The user may fold the seat 24 into the second post 22 (see the seat position in FIG. 4), so that the user may be able to drive the personal mobility apparatus 10 in a standing mode while standing on the support platform 11.

Figure 3:
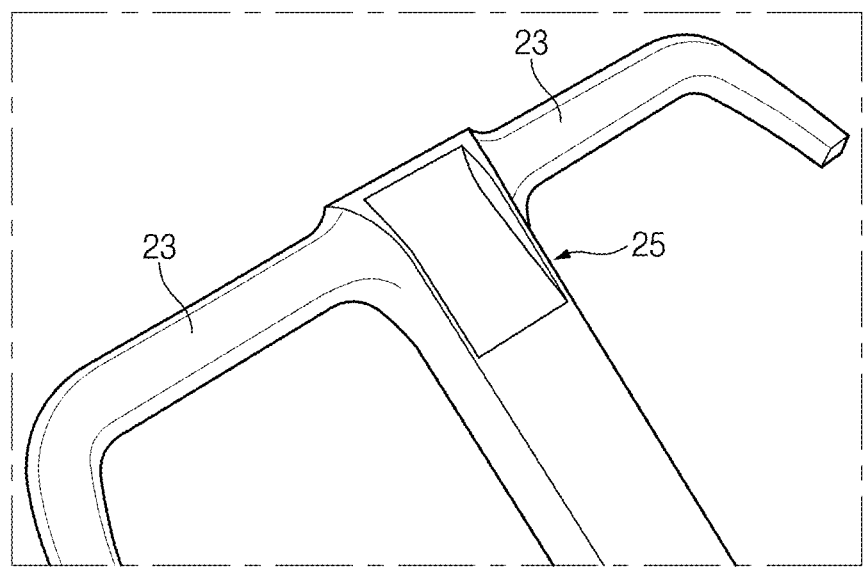
FIG. 3 illustrates a handle and a display in a personal mobility apparatus according to an embodiment of the present disclosure.

Referring to FIG. 3, the main post 20 may have a pair of handles 23 and a display 25. The pair of handles 23 and the display 25 may be mounted on a top end of the second post 22. The display 25 may be disposed between the pair of handles 23 and the display 25 may be configured to implement a user experience (UX) function, a user interface (UI) function, and/or the like.

The two drive wheels 51 and 52 may be connected to both left and right sides, respectively, of the support platform 11 to be drivable. Each of the drive wheels 51 and 52 may have an in-wheel motor (not shown) built therein and may be individually driven by the in-wheel motor.

A steering wheel 53 may be connected to the rear of the support platform 11 through a telescopic tube 40.

The steering wheel 53 may be connected to a wheel fork 44. The wheel fork 44 may have a steering shaft 44a and the steering shaft 44a of the wheel fork 44 may be mounted rotatably with respect to a steering block 43. An actuator (not shown) rotating the steering shaft 44a of the wheel fork 44 may be provided in the steering block 43. As the wheel fork 44 rotates around a vertical axis of the steering shaft 44a, the steering wheel 53 may steer the personal mobility apparatus 10.

The telescopic tube 40 may include a first tube 41 and a second tube 42 moving telescopically with respect to the first tube 41. As the second tube 42 is moved with respect to the first tube 41 by a drive means (not shown), the telescopic tube 40 may retract or deploy, i.e., extend. Thus, an overall length of the telescopic tube 40 may be adjusted according to driving speed, surrounding environment, and the like. For example, when the driving speed is high, the length of the telescopic tube 40 may be increased. In an external environmental condition such as a narrow space, the length of the telescopic tube 40 may be reduced.

The support platform 11 may have a cavity 13 in which the telescopic tube 40, the steering block 43, and the wheel fork 44 are received. The cavity 13 may be provided in the rear of the support platform 11.

The steering block 43 may be pivotally connected to the telescopic tube 40 through a third hinge 33. In particular, the steering block 43 may be pivotally connected to the second tube 42 of the telescopic tube 40 through the third hinge 33. As the steering block 43 pivots toward the second tube 42, the steering wheel 53 may be separated from the ground.

Figure 4:
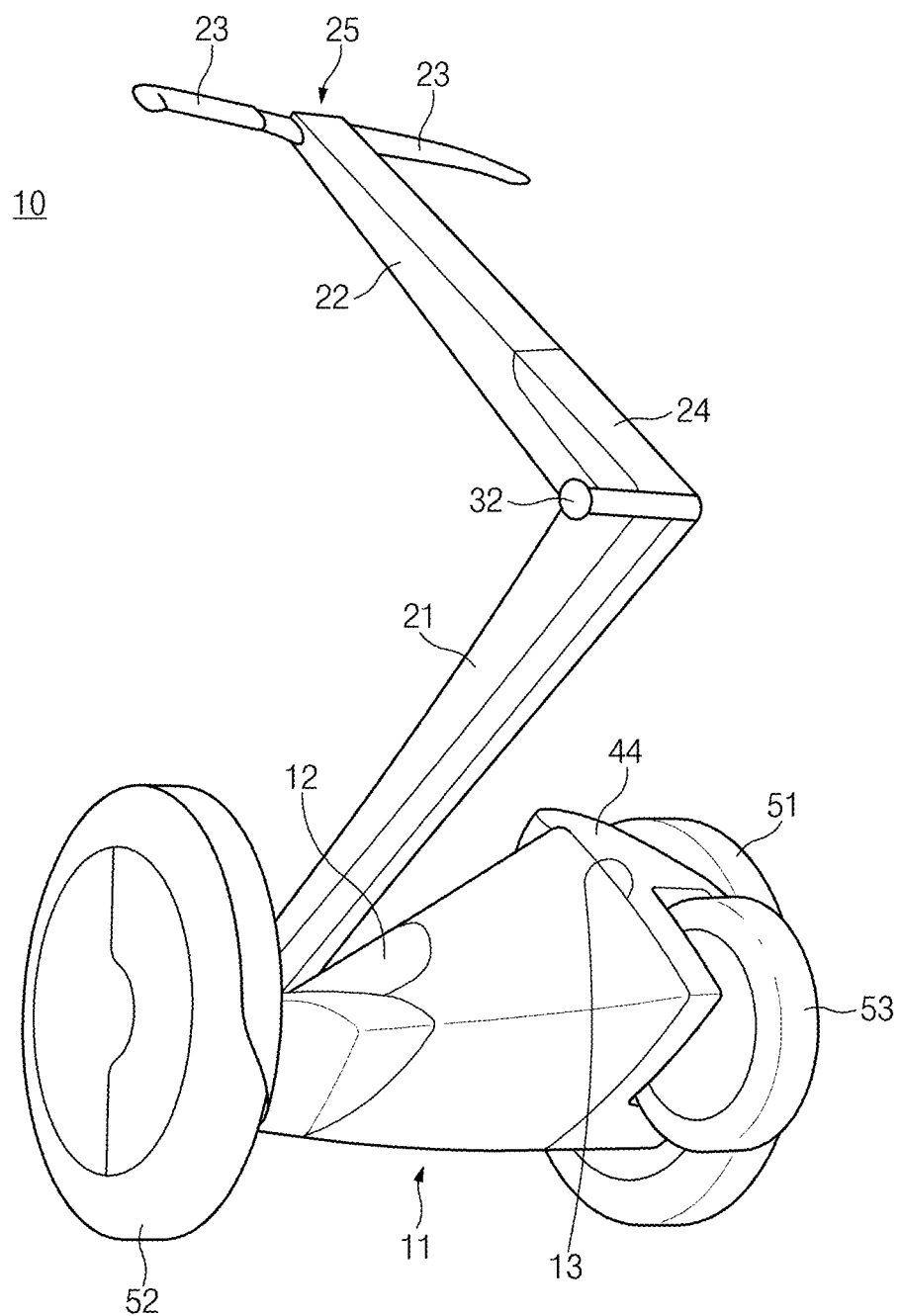
FIG. 4 illustrates a rear perspective view of a personal mobility apparatus according to an embodiment of the present disclosure.

The first tube 41 of the telescopic tube 40 may be moved to the inside or outside of the cavity 13 by a drive means (not shown). As the second tube 42 moves into the first tube 41, the telescopic tube 40 may completely retract, and the steering block 43 may pivot toward the second tube 42. As the first tube 41 of the telescopic tube 40 moves into the inside of the cavity 13, the telescopic tube 40, the steering block 43, and the wheel fork 44 may be completely received in the cavity 13 as illustrated in FIG. 4. As the first tube 41 of the telescopic tube 40 is moved to the outside of the cavity 13 by the drive means, and the second tube 42 is moved from the first tube 41 toward the outside, the telescopic tube 40 may deploy, and the steering block 43 may pivot toward the ground. The steering wheel 53 may be drawn out from the cavity 13 and the steering wheel 53 may be brought into contact with the ground.

As the telescopic tube 40 and the steering block 43, to which the steering wheel 53 is connected, retract into the cavity 13 or deploy from the cavity 13, the user may selectively switch between a two-wheel mode and a three-wheel mode according to operating conditions, external environmental conditions, and the like. The two-wheel mode refers to a mode that allows the personal mobility apparatus 10 to drive with only the two drive wheels 51 and 52. The three-wheel mode refers to a mode that allows the personal mobility apparatus 10 to drive with the two drive wheels 51 and 52 and the steering wheel 53. For example, the two-wheel mode may be selected under low speed condition, indoor, and narrow spaces, and the three-wheel mode may be selected in an outdoor environment allowing high speed driving. By selectively switching between the two-wheel mode and the three-wheel mode according to the operating conditions, the external environmental conditions, and the like, ease of use may be enhanced.

Figure 5:
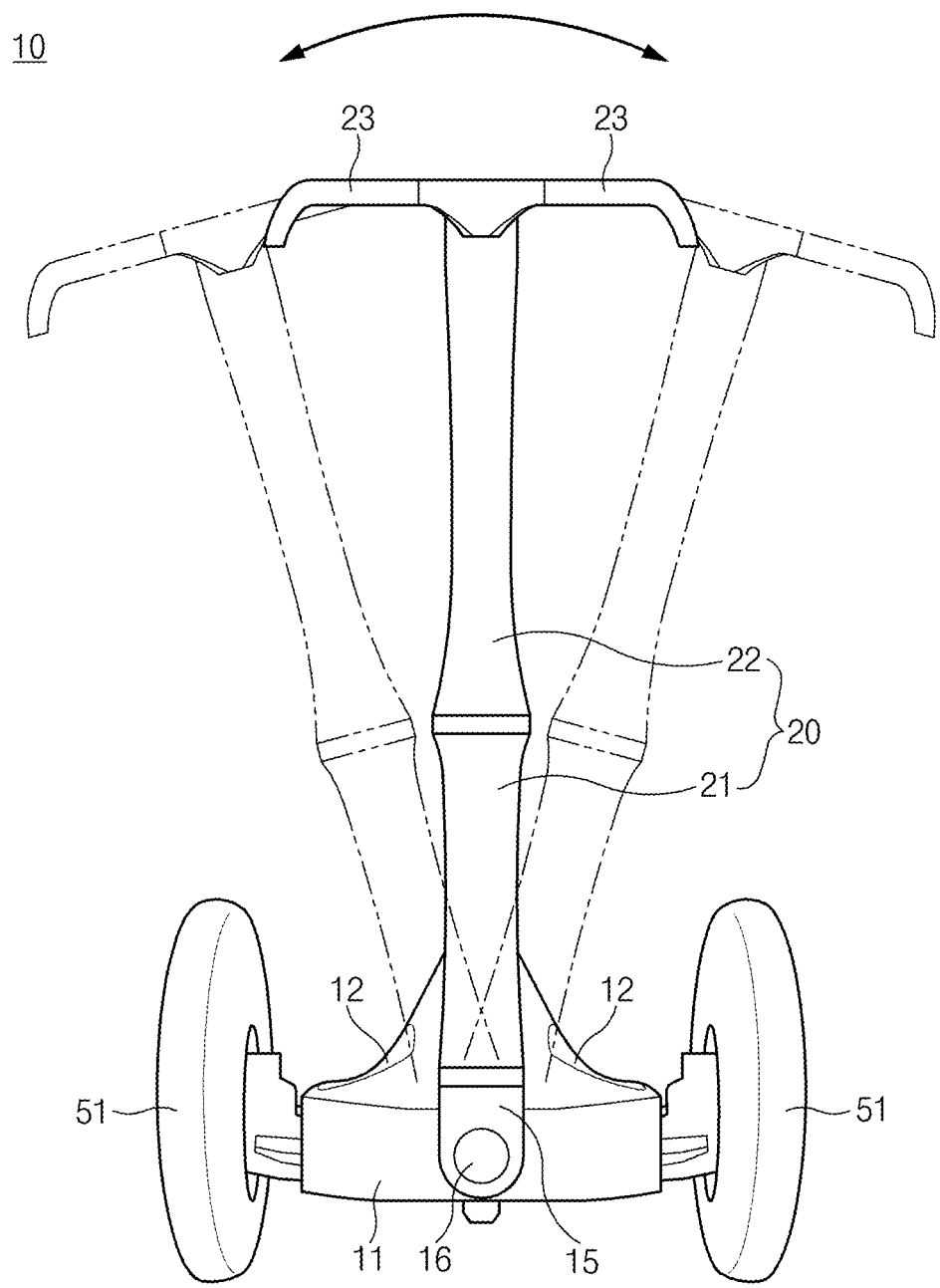
FIG. 5 illustrates a front view of a personal mobility apparatus according to an embodiment of the present disclosure.

As illustrated in FIG. 5, as the base member 15 rotates around the shaft 16, the user may grip the handles 23 to tilt the main post 20 to the left and right. As the user tilts the main post 20 to the left and right, the user's steering intention may be transmitted to a controller (not shown), which may be mounted in the main post 20. For example, by tilting the main post 20 to the left, a steering signal corresponding to the steering intention to steer the personal mobility apparatus to the left may be transmitted to the controller. The controller may rotate the wheel fork 44 to the left and the steering wheel 53 may be steered to the left. Thus, the personal mobility apparatus 10 may turn to the left. By tilting the main post 20 to the right, a steering signal corresponding to the steering intention to steer the personal mobility apparatus 10 to the right may be transmitted to the controller. The controller may rotate the wheel fork 44 to the right and the steering wheel 53 may be steered to the right. Thus, the personal mobility apparatus 10 may turn to the right.

Figure 6:
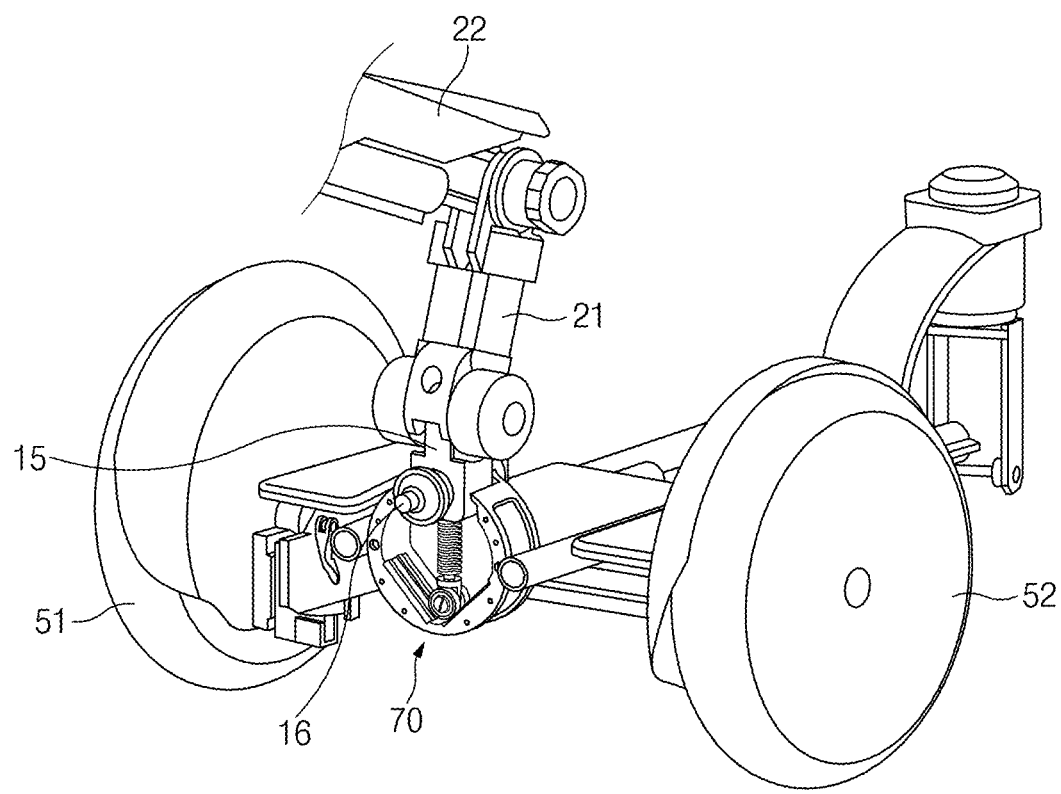
FIG. 6 illustrates a base member and a return mechanism in a personal mobility apparatus according to an embodiment of the present disclosure.
Figure 7:
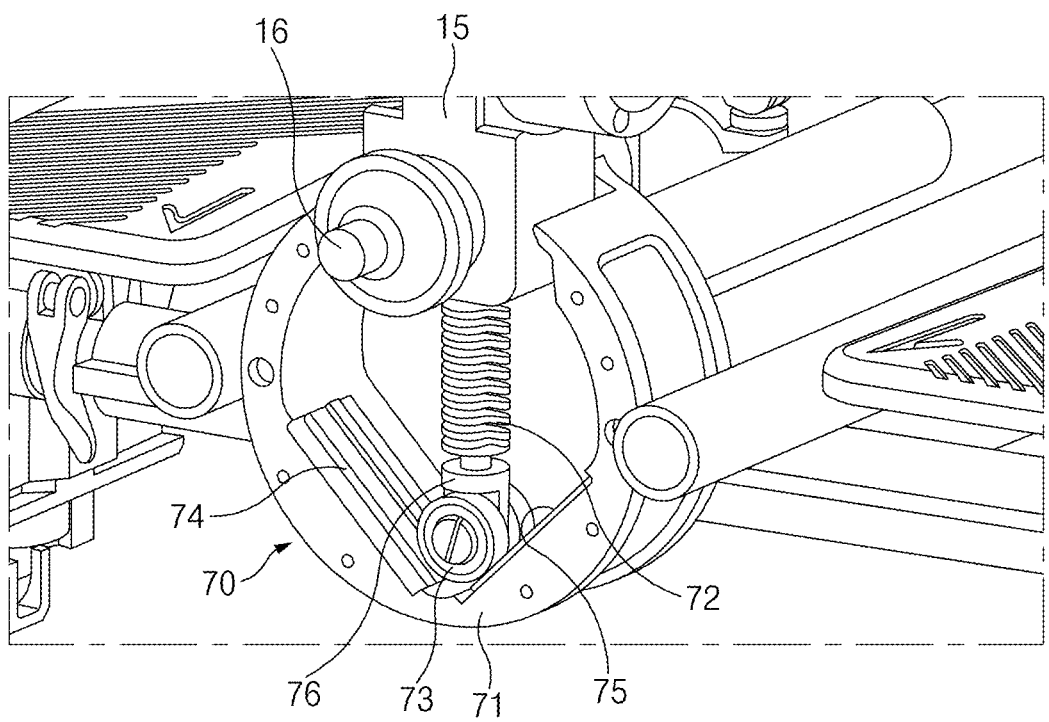
FIG. 7 illustrates an enlarged view of the return mechanism of FIG. 6.

As illustrated in FIGS. 6 and 7, the personal mobility apparatus 10 according to an embodiment of the present disclosure may further include a return mechanism 70 returning the base member 15 to a center position after the base member 15 rotates to the left or right of the shaft 16.

The return mechanism 70 may include a housing 71 located below the base member 15, a spring 72 connected to the base member 15, a roller 73 connected to the spring 72, and a pair of inclined surfaces 74 and 75 symmetrically disposed on both left and right inner sides, respectively, of the housing 71.

The housing 71 may be fixed to the support platform or the like and the spring 72 may be a compression spring. A top end of the spring 72 may be connected to a bottom end of the base member 15 and a bottom end of the spring 72 may be connected to a roller bracket 76.

The roller bracket 76 may rotatably support the roller 73. As the base member 15 rotates around the shaft 16, the roller 73 may contact any one of the pair of inclined surfaces 74 and 75.

As the user tilts the main post 20 in the left or right direction, the base member 15 may be rotated in the left or right direction through the shaft 16. Accordingly, the spring 72 may be tilted in a direction opposite to that of the base member 15. As the roller 73 contacts any one of the inclined surfaces 74 and 75, the spring 72 may be compressed. When a force is removed, the main post 20 may return to the center position by the compression force of the spring 72. In particular, as a tilting angle of the main post 20 increases, the amount of compression of the spring 72 may increase, and the return force of the main post 20 may also increase.

By using the return mechanism 70, the main post 20 may easily return to the center position and a load due to self-weight may be minimized.

According to another embodiment, in the two-wheel mode, as the user tilts the body back and forth, the user may accelerate or decelerate the personal mobility apparatus 10.

According to another embodiment, in the three-wheel mode, as the user tilts the body to the left and right while sitting on the seat 24, the user may steer the personal mobility apparatus 10.

As set forth above, the personal mobility apparatus according to embodiments of the present disclosure may selectively switch between the two-wheel mode and the three-wheel mode by varying the number of wheels according to operating condition, surrounding environment, and the like, thereby improving efficiency of mobility and enhancing ease of use.

Hereinabove, although the present disclosure has been described with reference to embodiments and the accompanying drawings, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A personal mobility apparatus comprising:
a support platform having a pair of footplates and a cavity;
two drive wheels disposed on both sides of the support platform;
a steering wheel connected to the support platform to be received in the cavity; and
a main post connected to the support platform through a base member,
wherein the base member is rotatably mounted on the support platform through a shaft.

2. The personal mobility apparatus according to claim 1, wherein the steering wheel is connected through a telescopic tube to be received in the cavity of the support platform.

3. The personal mobility apparatus according to claim 2, wherein the telescopic tube includes a first tube and a second tube moving telescopically with respect to the first tube.

4. The personal mobility apparatus according to claim 3, wherein the steering wheel is connected to a wheel fork,
wherein the wheel fork has a steering shaft,
wherein the steering shaft of the wheel fork is mounted rotatably with respect to a steering block, and
wherein the steering block is pivotally connected to the second tube of the telescopic tube.

5. The personal mobility apparatus according to claim 4, wherein the steering wheel is received in the cavity or is withdrawn from the cavity as the second tube moves telescopically with respect to the first tube and the first tube moves to the inside or outside of the cavity, respectively.

6. The personal mobility apparatus according to claim 1, wherein the main post includes a first post pivotally connected to the base member, and a second post pivotally connected to the first post.

7. The personal mobility apparatus according to claim 6, wherein a pair of handles are mounted on a top end of the second post, and
wherein a display is disposed between the pair of handles.

8. The personal mobility apparatus according to claim 6, further comprising a seat mounted on the second post, the seat configured to be folded or unfolded.

9. The personal mobility apparatus according to claim 1, further comprising a return mechanism returning the base member to a center position.

10. The personal mobility apparatus according to claim 9, wherein the return mechanism includes a housing located below the base member, a spring connected to the base member, a roller connected to the spring, and a pair of inclined surfaces symmetrically disposed on both left and right inner sides, respectively, of the housing, and
wherein the roller contacts any one of the pair of inclined surfaces as the base member rotates.

\* \* \* \* \*